(12) United States Patent
Huang et al.

(10) Patent No.: US 11,089,291 B2
(45) Date of Patent: Aug. 10, 2021

(54) DETECTION METHOD AND DETECTION DEVICE, ELECTRONIC DEVICE AND COMPUTER READABLE STORAGE MEDIUM

(71) Applicant: BEIJING KUANGSHI TECHNOLOGY CO., LTD., Beijing (CN)

(72) Inventors: Haibin Huang, Beijing (CN); Jue Wang, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 88 days.

(21) Appl. No.: 16/148,677

(22) Filed: Oct. 1, 2018

(65) Prior Publication Data
US 2019/0387221 A1    Dec. 19, 2019

(30) Foreign Application Priority Data
Jun. 13, 2018  (CN) .......................... 2018 1 0610595

(51) Int. Cl.
*H04N 17/00* (2006.01)
*H04N 13/254* (2018.01)
*H04N 13/00* (2018.01)

(52) U.S. Cl.
CPC ......... *H04N 17/002* (2013.01); *H04N 13/254* (2018.05); *H04N 2013/0077* (2013.01)

(58) Field of Classification Search
CPC ............... H04N 17/002; H04N 13/254; H04N 2013/007
See application file for complete search history.

(56) References Cited

U.S. PATENT DOCUMENTS

| | | | | |
|---|---|---|---|---|
| 2015/0009569 A1* | 1/2015 | Okagaki | ................ | G03B 21/62 359/599 |
| 2015/0120241 A1* | 4/2015 | Kadambi | ................ | G01S 17/89 702/166 |

* cited by examiner

*Primary Examiner* — Michael E Teitelbaum
(74) *Attorney, Agent, or Firm* — Hamre, Schumann, Mueller & Larson, P.C.

(57) ABSTRACT

A detection method for an image acquisition device, a detection device for an image acquisition device, an electronic device and a computer readable storage medium are disclosed. The image acquisition device includes a light source and a diffuser, the diffuser is configured to scatter light emitted by the light source and the light emitted by the light source is irradiated on at least partial area of a scene, the image acquisition device includes: acquiring an image of the scene; determining an effective area of the image; and determining whether or not the diffuser is in an abnormal working state according to information of the effective area.

18 Claims, 6 Drawing Sheets

DETECTION METHOD AND DETECTION DEVICE, ELECTRONIC DEVICE AND COMPUTER READABLE STORAGE MEDIUM

CROSS-REFERENCE TO RELATED APPLICATIONS

The application claims priority to Chinese patent application No. 201810610595.0, filed on Jun. 13, 2018, the entire disclosure of which is incorporated herein by reference as part of the present application.

TECHNICAL FIELD

Embodiments of the present disclosure relate to a detection method for an image acquisition device, a detection device for an image acquisition device, an electronic device and a computer readable storage medium.

BACKGROUND

In recent years, the application of a three-dimensional (3D) image acquisition device in an electronic device such as smart mobile terminals is increasing. For example, the 3D image acquisition device can be applied in time of flight (TOF) cameras. The 3D image acquisition device mainly includes a light source and a diffuser mounted in front of the light source. The light source emits light, and the diffuser scatters the light, therefore the light can be evenly illuminated on an entire scene (e.g., an entire scene for photographing). The camera can acquire (e.g., obtain) depth information of an object in the scene by collecting light reflected by the scene (e.g., an object in the scene) and then can output the 3D contour of the object.

SUMMARY

At least one embodiment of the present disclosure provides a detection method for an image acquisition device, the image acquisition device includes a light source and a diffuser, the diffuser is configured to scatter light emitted by the light source and the light emitted by the light source being irradiated on at least partial area of a scene, the detection method includes: acquiring an image of the scene; determining an effective area of the image; and determining whether or not the diffuser is in an abnormal working state according to information of the effective area.

For example, in at least one example of the detection method, determining of the effective area of the image is conducted by covering the image with a pre-set pattern; determining of the effective area of the image by covering the image with the pre-set pattern includes: obtaining a total amount of effective signals of the image; obtaining a first ratio through calculating a ratio of an amount of effective signals in a region, which is covered by the pre-set pattern, of the image to the total amount of effective signals; and comparing the first ratio with a preset ratio to obtain a comparison result, and obtaining the effective area of the image based on the comparison result.

For example, in at least one example of the detection method, obtaining of the effective area of the image based on the comparison result includes: in a case where the first ratio is greater than or equal to the preset ratio, setting the region, which is covered by the pre-set pattern, of the image as the effective area of the image; and in a case where the first ratio is smaller than the preset ratio, using a new pre-set pattern, a size of which is larger than a size of the pre-set pattern, to conduct determining of the effective area of the image by covering the image with the new pre-set pattern.

For example, in at least one example of the detection method, a center of the image coincides with a center of the pre-set pattern; the total amount of effective signals is a sum of brightness values of the pixels of the image; and the amount of effective signals in the region, which is covered by the pre-set pattern, of the image is equal to a sum of the brightness values of pixels in the region, which is covered by the pre-set pattern, of the image.

For example, in at least one example of the detection method, the detection method further includes: performing an image thresholding process to the image, in which performing of the image thresholding process to the image includes: determining initial brightness values of the pixels in the image; setting brightness values of a first group of the pixels, initial brightness values of which are within a set brightness range, to be initial brightness values of corresponding pixels; and setting brightness values of a second group of the pixels, initial brightness values of which are outside the set brightness range, to be zero.

For example, in at least one example of the detection method, the detection method further includes: determining an abnormity degree of the diffuser according to the information of the effective area, in which determining of the abnormity degree of the diffuser according to the information of the effective area includes: determining that a first degree abnormity of the diffuser is present, in a case where a ratio between an area of the effective area and an area of the image is smaller than a first threshold; and determining that a second degree abnormity of the diffuser is present, in a case where the ratio between the area of the effective area and the area of the image is greater than a second threshold and is smaller than a third threshold; and the second threshold is greater than the first threshold and is smaller than the third threshold.

For example, in at least one example of the detection method, calculating of the ratio of the amount of effective signals in the region, which is covered by the pre-set pattern, of the image to the total amount of effective signals includes: obtaining the amount of effective signals in the region, which is covered by the pre-set pattern, of the image by adoption of integral images; and determining the ratio of the amount of effective signals in the region, which is covered by the pre-set pattern, of the image to the total amount of effective signals.

For example, in at least one example of the detection method, the detection method further includes: providing a set of pre-set patterns with sizes of the pre-set patterns being increased gradually; sequencing the set of pre-set patterns according to the sizes of the pre-set patterns, in which a pre-set pattern which is first to cover the image is a pre-set pattern, a size of which is smallest in the set of pre-set patterns, in the set of pre-set patterns; and the new pre-set pattern is immediately adjacent to the pre-set pattern after the set of pre-set patterns is sequenced.

For example, in at least one example of the detection method, determining of whether or not the diffuser is in the abnormal working state according to the information of the effective area includes: sequencing the set of pre-set patterns in order from small to large, and determining that the diffuser is in the abnormal working state if a serial number of the pre-set pattern corresponding to the effective area is less than or equal to a first pre-set serial number; or, sequencing the set of pre-set patterns in order from large to small, and determining that the diffuser is in the abnormal working state if a serial number of the pre-set pattern corresponding to the effective area is greater than or equal to a second pre-set serial number.

For example, in at least one example of the detection method, the detection method further includes: providing an initial pre-set pattern and a pre-set step length, in which a pre-set pattern which is first to cover the image is the initial pre-set pattern; and a difference between the size of the new pre-set pattern and the size of the pre-set pattern is equal to the pre-set step length.

For example, in at least one example of the detection method, determining of whether or not the diffuser is in the abnormal working state according to the information of the effective area includes: determining that the diffuser is in the abnormal working state if an area of the effective area is less than or equal to a preset area.

For example, in at least one example of the detection method, determining of whether or not the diffuser is in the abnormal working state according to the information of the effective area includes: determining that the diffuser is in the abnormal working state if a ratio of an area of the effective area to an area of the image is less than or equal to a preset area ratio.

For example, in at least one example of the detection method, the detection method further includes: outputting diffuser abnormity prompt information if the diffuser is determined to be in the abnormal working state.

For example, in at least one example of the detection method, determining of the effective area of the image is conducted by covering the image with a pre-set pattern; and determining of the effective area of the image by covering the image with the pre-set pattern comprises: obtaining a total amount of effective signals of the image; obtaining a first ratio through calculating a ratio of an amount of effective signals in a region, which is covered by the pre-set pattern, of the image to the total amount of effective signals; outputting prompt information that an abnormity is present or a size of the pre-set pattern is small in a case where the first ratio is less than or equal to the preset ratio; determining the effective area of the image based on a new pre-set pattern, a size of which is smaller than a size of the pre-set pattern in a case where the first ratio is larger than the preset ratio. Determining of the effective area of the image based on the new pre-set pattern comprises: obtaining a second ratio through calculating a ratio of an amount of effective signals in a region, which is covered by the new pre-set pattern, of the image to the total amount of effective signals; setting a region, which is covered by a previous pre-set pattern, of the image as the effective area of the image in a case where the second ratio is less than or equal to the preset ratio, in which the new pre-set pattern covers the image immediately after the previous pre-set pattern; and using another new pre-set pattern, a size of which is larger than the size of the new pre-set pattern, to conduct determining of the effective area of the image based on the another new pre-set pattern in a case where the second ratio is larger than the preset ratio.

For example, in at least one example of the detection method, determining of the effective area of the image includes: covering a pre-set pattern on the image; and setting a region, which is covered by the pre-set pattern, of the image as the effective area; and determining of whether or not the diffuser is in the normal working state according to the information of the effective area includes: obtaining a total amount of effective signals of the image; obtaining a first ratio through calculating a ratio of an amount of effective signals in a region, which is covered by the pre-set pattern, of the image to the total amount of effective signals; and determining whether or not the diffuser is in the abnormal working state through comparing the first ratio with a preset ratio.

At least one embodiment of the present disclosure further provides a detection device for an image acquisition device, the image acquisition device includes a light source and a diffuser, the diffuser being configured to scatter light emitted by the light source and the light emitted by the light source being irradiated on at least partial area of a scene, the detection device includes: an image acquisition module which is configured to acquire an image of the scene; an effective area determination module which is configured to determine an effective area of the image; and an abnormity determination module which is configured to determine whether or not the diffuser is in an abnormal working state according to information of the effective area.

At least one embodiment of the present disclosure further provides a detection device, which includes: a processor and a memory. The memory is configured to store computer program instructions that are suitable to be executed by the processor; and upon the processor running the computer program instructions, the detection device performs a following method includes: acquiring an image of a scene, in which light emitted by a light source is irradiated on at least partial area of the scene; determining an effective area of the image; and determining whether or not a diffuser is in an abnormal working state according to information of the effective area, in which the diffuser is configured to scatter light emitted by the light source.

For example, in at least one example of the detection device, determining of the effective area of the image is conducted by covering the image with a pre-set pattern; and determining of the effective area of the image by covering the image with the pre-set pattern includes: obtaining a total amount of effective signals of the image; obtaining a first ratio through calculating a ratio of an amount of effective signals in a region, which is covered by the pre-set pattern, of the image to the total amount of effective signals; and comparing the first ratio with a preset ratio to obtain a comparison result, and obtaining the effective area of the image based on the comparison result. Determining of whether or not the diffuser is in the abnormal working state according to the information of the effective area includes: determining that the diffuser is in the abnormal working state if an area of the effective area is less than or equal to a preset area; or determining that the diffuser is in the abnormal working state if a ratio of an area of the effective area to an area of the image is less than or equal to a preset area ratio.

At least one embodiment of the present disclosure further provides an electronic device, which includes an image acquisition device, a memory and a processor. The image acquisition device includes a light source and a diffuser; the diffuser is configured to scatter light emitted by the light source and the light emitted by the light source is irradiated on at least partial area of a scene; the memory is configured to store computer program instructions that are suitable to be executed by the processor; and the detection method provided by any one of the embodiments of the present disclosure is performed upon the processor running the computer program instructions.

At least one embodiment of the present disclosure further provides a computer readable storage medium, in which computer program instructions are stored on the computer readable storage medium; and the detection method provided by any one of the embodiments of the present disclosure is performed upon a processor running the computer program instructions.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and so on are only used to indicate relative position relationship, and when the position of the object which is described is changed, the relative position relationship may be changed accordingly.

If an image acquisition device (e.g., a 3D image acquisition device), for example, collides with a foreign object (for example, during operation of the image acquisition device), the diffuser of the image acquisition device may fall off. Once the diffuser falls off, the light emitted by a light source may propagate toward a specific direction and cannot illuminate on the entire scene evenly. In this case, the camera of the image acquisition device cannot sense the depth of at least partial objects to be photographed (for example, all the objects to be photographed) in the scene (for example, the scene to be photographed) normally, and therefore the failure of the 3D image acquisition device can be caused. Therefore, the abnormity detection (for example, fall-off detection) technology of the diffuser has relatively large application value. However, currently, there is still no good diffuser abnormity detection method.

Embodiments of the present disclosure provide a detection method for an image acquisition device, a detection device for an image acquisition device, an electronic device and a computer readable storage medium. The detection method (for example, a diffuser abnormity detection method) and the detection device (for example, a diffuser abnormity detection device) can be applied in an image acquisition device or an electronic device equipped with an image acquisition device. The image acquisition device includes a light source and a diffuser, and the diffuser is configured to scatter light emitted by the light source and the light emitted by the light source is irradiated on at least partial area of a scene. In some embodiments of the present disclosure, the detection method, the detection device, the electronic device, and the computer readable storage medium can detect (rapidly detect) whether or not the diffuser in the image acquisition device (for example, 3D image acquisition device) of the electronic device the diffuser is in an abnormal working state (for example, the diffuser falls off), and then can prompt the user in time when the diffuser is in an abnormal working state (for example, the diffuser falls off), thereby improving the use experience of the user. Detailed description will be given below to the embodiments of the present disclosure.

The embodiments of the present disclosure provide an example of an electronic device which is configured for implementing the detection method provided by the embodiments of the present disclosure (that is, electronic device 100). Descriptions will be given below to the electronic device 100 with reference to FIG. 1.

Figure 1:
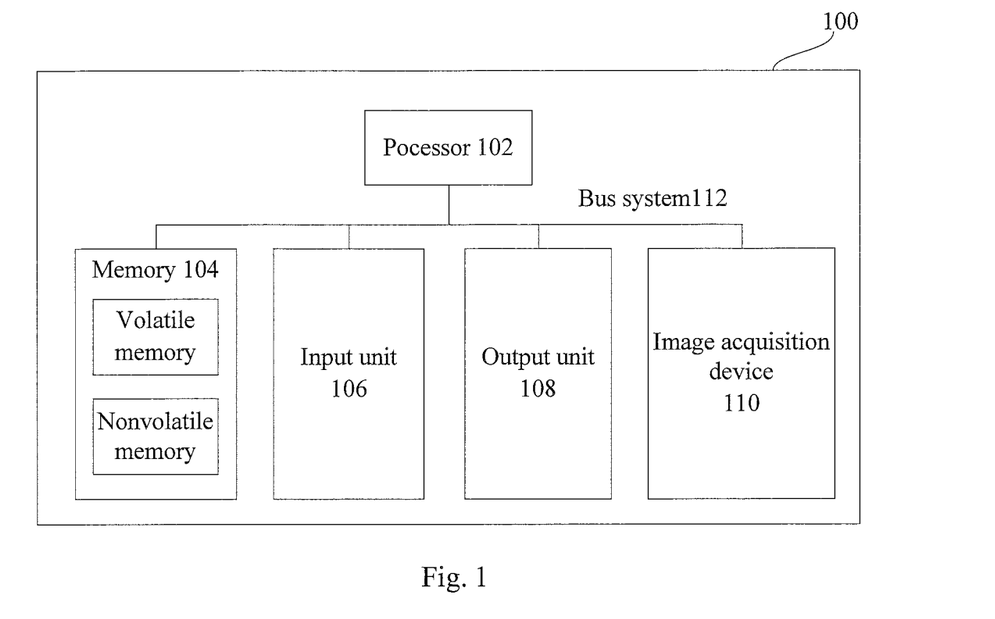
FIG. 1 is an exemplary block diagram of an electronic device provided by an embodiment of the present disclosure.

As illustrated in FIG. 1, the electronic device 100 includes one or more processors 102, one or more memories 104, an input unit 106, an output unit 108 and an image acquisition device 110. These components can be connected with each other through a bus system 112 and/or connecting mechanisms in other forms (not illustrated, for example, wireless connection). It should be noted that the components and the structures of the electronic device 100 as illustrated in FIG. 1 are only illustrative and not limitative. The electronic device may also include other components and structures as required.

The processor 102 may be a central processing unit (CPU) or a processing unit of other forms (for example, the processing unit of other forms includes at least part of a hardware) having data processing capability and/or instruction execution capability, and can control other components in the electronic device 100 to execute desired functions. For example, the processor may be implemented by a general-purpose processor, and may also be a microcontroller unit (MCU), a microprocessor, a digital signal processor (DSP), a dedicated image processing chip, a field programmable logic array (FPLA) or so on.

The memory 104 may include one or more computer program products. The computer program products may include a variety of forms of computer readable storage media, e.g., volatile memories and/or nonvolatile memories. The volatile memory, for example, may include a random access memory (RAM) and/or a cache. The nonvolatile memory, for example, may include a read-only memory (ROM), a hard disk, a flash memory, etc. One or more computer program instructions may be stored on the computer readable storage medium. The processor 102 may run the program instructions, so as to realize the function as described below in the embodiments of the present disclosure (implemented by the processor) and/or other desired functions. A variety of applications and a variety of data, e.g., a variety of data used and/or produced by the applications, may also be stored in the computer readable storage medium.

The input unit 106 may be a device that is used by a user to input instructions, and may include one or more selected from a keyboard, a mouse, a microphone or a touch panel. For example, the input unit 106 may be configured to input a preset ratio.

The output unit 108 may output various kinds of information (e.g., image or sound) to the outside (for example, the user), and may include one or more of a display, a loudspeaker and so on. For example, the output unit 108 may be configured to prompt the user that the diffuser is abnormal.

The image acquisition device 110 can capture images (e.g., photos and videos) desired by the user, and store the captured images into the memory 104 for the use of other components. Specifically, the image acquisition device 110 includes a 3D image acquisition device. The 3D image acquisition device includes a light source and a diffuser mounted in front of the light source (for example, the diffuser is disposed on a light-emitting side of the light source). The light source emits light, and the diffuser scatters (for example, diffuses) the light, so that the light emitted by the light source can be evenly (for example, when the diffuser does not fall off) illuminated on the entire scene to be photographed; and the camera of the 3D image acquisition device can sense (for example, obtain) depth information of objects based on acquired reflected light from the objects, and then can output 3D contours of the objects. For example, the light source in the 3D image acquisition device may be an infrared light source. For example, the light source may also be a special-purpose light source (for example, one or more light-emitting diodes (LEDs) or laser diodes arranged in a certain way, for another example, a flash lamp for the camera). The light source, for example, can emit monochromatic light (e.g., infrared light) or polychromatic light (e.g., white light).

It should be noted that in the description below of the detection method, the detection device, the electronic device and a computer readable storage medium, for clarity, the specific structure of the processor, the memory, the light source, the diffuser and the output unit will not be described in details, and the processor, the memory, the light source, the diffuser and the output unit in the following examples may refer to the example as illustrated in FIG. 1.

Illustratively, the illustratively electronic device for implementing the detection method and detection device, provided by the embodiments of the present disclosure, can be applied in an electronic camera and may also be applied in electronic devices such as a computer, a mobile terminal such as a smart mobile phone and a tablet PC.

The 3D image acquisition device is widely applied in electronic devices such as smart mobile terminals. If the electronic device, for example, collides with a foreign object (for example, during operation of the electronic device), the diffuser of the 3D image acquisition device may fall off, thereby resulting in the failure of the 3D image acquisition device.

At least one embodiment of the present disclosure provides a detection method for an image acquisition device. In some embodiments, the detection method can detect (for example, rapidly detect) whether or not the diffuser of the 3D image acquisition device is in an abnormal working state (for example, the diffuser falls off or not). It should be noted that the steps illustrated in the flowchart of the accompanying drawing can be executed in a computer system including a set of computer executable instructions. Moreover, although a logical order has been illustrated in the flowchart, in some cases, the steps illustrated or described can be performed in an order which is different from the one described herein.

Non-limitive descriptions are given to the detection method for the image acquisition device provided by the embodiments of the present disclosure in the following with reference to a plurality of examples. As described in the following, in case of no conflict, different features in these specific examples may be combined so as to obtain new examples, and the new examples are also fall within the scope of present disclosure It should be noted that illustrative description is given to the embodiments of the present disclosure by taking the case where the image acquisition device is implemented as the 3D image acquisition device as an example, but the embodiments of the present disclosure is not limited thereto.

Figure 2:
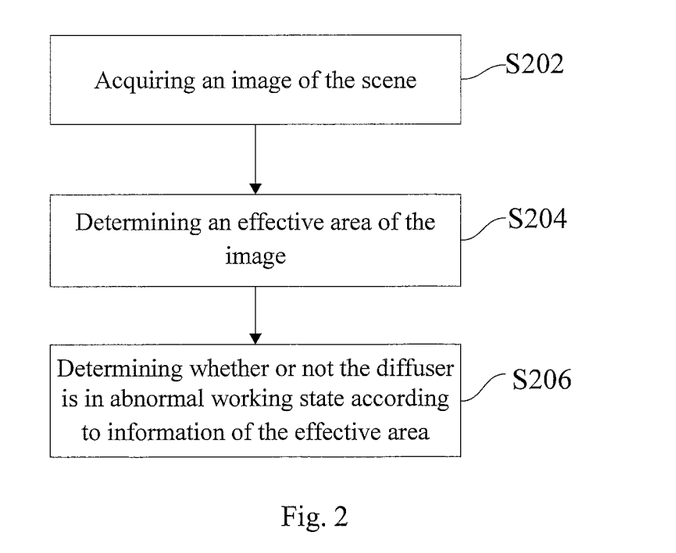
FIG. 2 is an exemplary flowchart of a detection method provided by an embodiment of the present disclosure.
Figure 3:
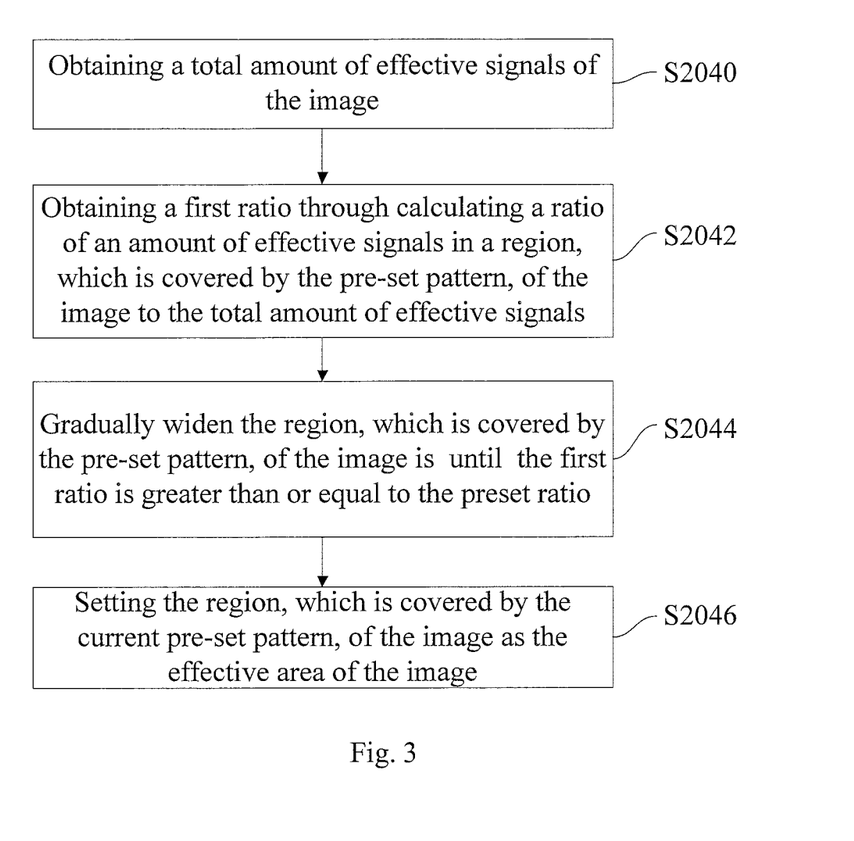
FIG. 3 is an illustrative flowchart for determining an effective area of an image in a detection method provided by an embodiment of the present disclosure.

FIG. 2 is a flowchart of a detection method for an image acquisition device provided by the embodiments of the present disclosure. As illustrated in FIG. 2, the method can be applied in an image acquisition device or an electronic device equipped with an image acquisition device. The image acquisition device includes a light source and a diffuser, and the diffuser is configured to scatter light emitted by the light source, and the light emitted by the light source being irradiated on at least partial area of a scene. The method includes the following steps S202, S204 and S206.

S202: acquiring an image of the scene.

For example, a 3D image acquisition device is provided in an electronic device such as a camera (e.g., an electronic camera), a smart mobile phone or a tablet PC; a light source in the 3D image acquisition device emits light, and the light is irradiated on the scene (for example, the scene to be photographed). An image sensor (for example, a depth camera) of the image acquisition device acquires (for example, captures) the image of the scene. That is, the image of the scene is captured by the image acquisition device in the case where the light emitted by the light source is irradiated on at least partial area of the scene.

S204: determining an effective area of the image.

Figure 6:
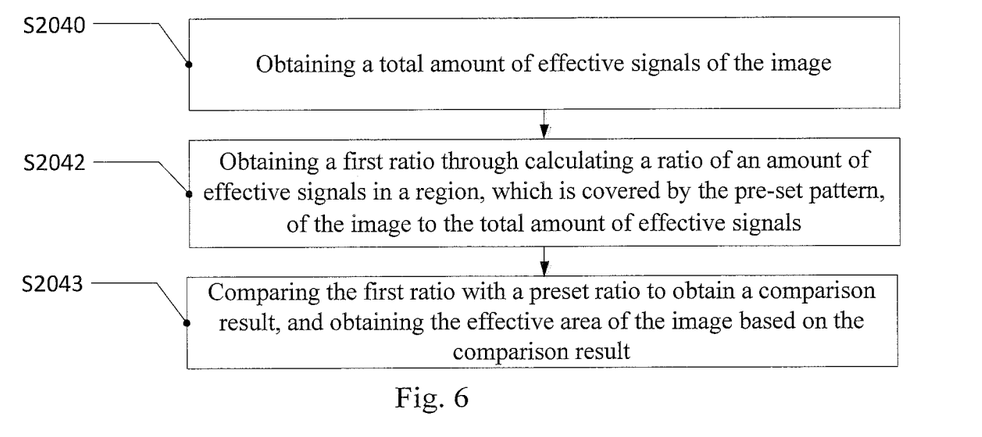
FIG. 6 is another illustrative flowchart for determining an effective area of an image in a detection method provided by an embodiment of the present disclosure.

For example, the determination method of the effective area of the image may be set according to actual application demands, and no specific limitation will be given to the embodiments of the present disclosure in this respect. For example, determining of the effective area of the image can be conducted by covering the image with a pre-set pattern. Illustrative description will be given below to the specific steps of determining the effective area of the image with reference to FIG. 6. For example, as illustrated in FIG. 6, the process of determining the effective area of the image may include the steps S2040, S2042 and S2043.

S2040: obtaining a total amount of effective signals of the image.

For example, the total amount of effective signals of the image can be obtained through calculating the total amount of effective signals of the image according to brightness values of pixels of the image, and the total amount of effective signals of the image, for example, may be stored in a memory after calculation. For another example, the total amount of effective signals of the image can be obtained through reading the value of the total amount of effective signals of the image which is stored in the memory.

For example, the brightness values of the pixels may be determined according to grayscale values of the pixels of the image. For example, the initial brightness value of each pixel in the image may be all within [0, 255] (that is, greater than or equal to zero and less than or equal to 255). For example, the total amount of effective signals of the image may be acquired by the summation of the brightness values of the pixels.

For example, according to actual application demands, the process of determining the effective area of the image may also include the following step S2041. For example, the step S2041 may be executed before the step S2040 is executed.

S2041: obtaining the brightness values of the pixels of the image by performing an image thresholding process to the image. The image thresholding process may be adopted to remove noise (a small amount of noise) in the image. Illustrative description will be given below to the image thresholding process with reference to one example. The image thresholding process may include the following steps.

S2041a: determining initial brightness values of the pixels of the image.

S2041b: setting brightness values of a first group of the pixels, initial brightness values of which are within a set brightness range, to be initial brightness values of corresponding pixels; and setting brightness values of a second group of the pixels, initial brightness values of which are outside the set brightness range, to be zero.

For example, a threshold T may be set to remove the noise in the image, and the noise may originate from the inherent noise (e.g., the dark current noise) of the image sensor of the image acquisition device. The threshold T may be a value close to 0. For example, the inventors of the present disclosure noted based on experience that the threshold T may be set to be in the range of 4 and 6 (e.g., 5). The inventors of the present disclosure noted that: if the threshold T is less than 4, part of the image noise may be unable to be removed; and if the threshold T is greater than 6, at least part of brightness values of partial pixels may be deducted, which may cause the brightness values of the pixels to deviate from the true value.

For example, as for the pixels (that is, the first group of the pixels) of which the initial brightness value is within the set brightness range (T, 255), the brightness values (that is, corrected brightness values) of these pixels (that is, the first group of the pixels) may be set to be the initial brightness values of corresponding pixels; and as for the pixels (that is, the second group of the pixels) of which the initial brightness value is less than or equal to T or equal to 255, the brightness values of these pixels (that is, the second group of the pixels) may be set to be 0 (zero).

For example, the brightness values of the pixels of the image may be obtained by the following formula:

$$I_x = \begin{cases} 0, & I'_x \leq T \\ I'_x, & T < I'_x < 225 \\ 0, & I'_x = 255 \end{cases}.$$

Where x is the coordinate of the pixel in the image; $I'_x$ is the initial brightness value of the pixel with the coordinate of x in the image; and $I_x$ is the brightness value (that is, corrected brightness value) of the pixel with the coordinate of x in the image after the image thresholding process is performed.

For example, in the case where the process of determining the effective area of the image includes the step S2041, the total amount of effective signals is the sum of the brightness values of the pixels of the image after the image thresholding process is performed, and may be calculated by the following formula: $S=\Sigma_x I_x$, where S is the total amount of effective signals of the image.

S2042: obtaining a first ratio through calculating a ratio of an amount of effective signals in a region, which is covered by the pre-set pattern, of the image to the total amount of effective signals.

For example, the center of the image of the scene may be set to be the center of the pre-set pattern. It should be noted that according to actual application demands, the center of the pre-set pattern may also have a predetermined offset from the center of the image. No further description will be given here.

For example, the pre-set pattern may be used for covering the image of the scene, and the brightness values (for example, corrected brightness values) of the pixels corresponding to (covered by) the pre-set pattern can be obtained after the image of the scene is covered by the pre-set pattern. The amount of effective signals in the region, which is covered by the pre-set pattern, of the image is the sum of the brightness values of the pixels in the region, which is covered by the pre-set pattern, of the image. The pre-set pattern can be a regular pattern such as a circle, an ellipse, a square, a rectangle or a triangle.

S2043: comparing the first ratio with a preset ratio to obtain a comparison result, and obtaining the effective area of the image based on the comparison result.

For example, obtaining of the effective area of the image based on the comparison result includes: in a case where the first ratio is greater than or equal to the preset ratio, setting the region, which is covered by the pre-set pattern, of the image as the effective area of the image; and in a case where the first ratio is smaller than the preset ratio, using a new pre-set pattern, a size of which is larger than a size of the pre-set pattern, to conduct determining of the effective area of the image by covering the image with the new pre-set pattern (that is, repeatedly executing the steps S2040, S2042 and S2043 in the case where that the first ratio is smaller than the preset ratio).

For example, in some examples, the effective area of the image can be determined based on a set of pre-set pattern (e.g., at least one rectangle). Detailed description will be given below to the process of obtaining the set of pre-set pattern with reference to a plurality of examples. For clarity, illustrative description will be given below by taking the case where the pre-set pattern is a rectangle as an example. In the case where the pre-set pattern is in other shapes, adaptive adjustment may be made according to the following method. No further description will be given here.

In one example, a set of rectangles, with sizes of the rectangles being increased gradually increasing may be set (for example, preset). For example, the sizes of the rectangles are increased gradually increasing may mean that the lengths of the rectangles are gradually increasing, and the widths of the rectangles are gradually increasing. For another example, the sizes of the pre-set patterns are increased gradually increasing may also mean that the lengths of the rectangles are gradually increasing while the widths of the rectangles stay unchanged, or the widths of the rectangles are gradually increasing while the lengths of the rectangles stay unchanged.

For example, the sizes of the set of rectangles can be obtain through the following equation:

$$R_i = \left(W * \frac{i}{N}, H * \frac{i}{N}\right), i = 1, 2, 3, \ldots, N,$$

in which W is the length of the rectangle $R_N$ with the maximum size in the set of rectangles, and H is the width of the rectangle $R_N$ with the maximum size in the set of rectangles; and correspondingly, W/N is the length of the rectangle with the minimum size in the set of rectangles, and H/N is the width of the rectangle with the minimum size in the set of rectangles. The area of the rectangle with the maximum size in the set of rectangles may be less than or equal to the area of the image. N may be set according to the size of the image, for example, may be set to be 8-12 (for example, 10). In the example, the lengths and the widths of the rectangles in the above set of rectangles may be stored in the memory and can be directly read out during calculation, such that the amount of calculation is reduced.

For example, the center of the image can be set to be the center of the rectangle. The region, which is covered by the pre-set pattern, of the image can be gradually widened by sequentially applying at least part of rectangles in the set of rectangles in order from small to large. In an example, sequentially applying at least part of rectangles in the set of rectangles in order from small to large includes: firstly, using the rectangle with the minimum size in the set of rectangles to cover the image; then, using a new rectangle to cover the image, in which the new rectangle has a size which is larger than the size of the rectangle with the minimum size in the set of rectangles and is immediately adjacent to the rectangle with the minimum size after the set of rectangles are sequenced according to size; next, using another new rectangle to cover the image, in which the another new rectangle has a size which is larger than the size of the new rectangle and is immediately adjacent to the new rectangle after the set of rectangles are sequenced according to size.

In another example to obtain a set of pre-set pattern, the set of the pre-set patterns are also rectangles. The length and the width of the rectangle are respectively W and H (the maximum length and the maximum width are respectively W and H, and the minimum length and the minimum width are respectively W/N and H/N); and the region, which is covered by the rectangle, of the image can be gradually widened according to a pre-set step length $$\left(W * \frac{i}{N}, H * \frac{i}{N}\right).$$

N may be set according to the size of the image, for example, may be set to be 8-12 (for example, 10). In the presented example, the memory may only need to store, for example, the minimum length and the minimum width of the rectangle and the step length to provide the set of the pre-set patterns, such that the amount of data stored is reduced, particularly in the case of large N value.

Illustrative description will be given below to the process of determining the effective area of the image based on a set of pre-set pattern with reference to a plurality of examples.

In an example, the steps S2040 and S2042 may be executed based on the pre-set pattern (e.g., rectangle) with the minimum size in the set of pre-set pattern at first. For example, the ratio (that is, the first ratio) of the amount of effective signals to the total amount of effective signals of the image may be obtained based on the pre-set pattern (e.g., rectangle) with the minimum size in the set of pre-set pattern at first; and then a first ratio is obtained through calculating a ratio of an amount of effective signals in a region, which is covered by the pre-set pattern with the minimum size, of the image to the total amount of effective signals.

Next, the step S2046 is executed if the first ratio is greater than or equal to the preset ratio, that is, the region, which is covered by the pre-set pattern with the minimum size in the set of pre-set pattern, of the image is set as the effective area of the image if the first ratio is greater than or equal to the preset ratio. The step S2044 is executed if the ratio of the amount of effective signals to the total amount of effective signals of the image is less than the preset ratio, that is, the region, which is covered by the pre-set pattern, of the image is gradually widened until the ratio (that is, the first ratio) of the amount of effective signals in the region, which is covered by the pre-set pattern, of the image to the total amount of effective signals is greater than or equal to the preset ratio.

In an example, the region, which is covered by the pre-set pattern, of the image is gradually widened until the first ratio is greater than or equal to the preset ratio includes: using a new pre-set pattern, to cover the image and determining that whether or not the first ratio obtained based on the new pre-set pattern is greater than or equal to the preset ratio, in which the new pre-set pattern has a size which is larger than the size of the pre-set pattern with the minimum size in the set of pre-set patterns and is immediately adjacent to the pre-set pattern with the minimum size after the set of pre-set patterns are sequenced according to size. If it is determined that the first ratio obtained based on the new pre-set pattern is greater than or equal to the preset ratio, setting the region, which is covered by the new pre-set pattern, of the image as the effective area of the image. If it is determined that the first ratio obtained based on the new pre-set pattern is smaller than the preset ratio, using another new pre-set pattern to cover the image and determining that whether or not the first ratio obtained based on the another new pre-set pattern is greater than or equal to the preset ratio, in which another new pre-set pattern has a size which is larger than the size of the new pre-set pattern and is immediately adjacent to the new pre-set pattern after the set of pre-set patterns are sequenced according to size. If it is determined that the first ratio obtained based on another new pre-set pattern is greater than or equal to the preset ratio, setting the region, which is covered by another new pre-set pattern, of the image as the effective area of the image. If it is determined that the first ratio obtained based on another new pre-set pattern is smaller than the preset ratio, using further another new pre-set pattern(s) to determine that whether or not the first ratio obtained based on further another new pre-set pattern(s) is (are) greater than or equal to the preset ratio, no further descriptions will be given here.

Illustrative description will be given below to the method of obtaining the ratio (that is, the first ratio) of the amount of effective signals to the total amount of effective signals of the image.

For example, the amount of effective signals $S(R_i)$ in the region which is covered by each rectangle may be calculated by adoption of the following formula, that is, brightness values of pixels covered by the rectangle are summated:

$$S(R_i) = \Sigma_{x \in R_i} I_x,$$

where $R_i$ represents the region, which is covered by the $i^{st}$ rectangle, of the image; and $S(R_i)$ represents the amount of effective signals in the region, which is covered by the $i^{st}$ rectangle, of the image.

For example, description will be given below to an illustrative method of calculating the amount of effective signals in the region, which is covered by the rectangle, of the image and an illustrative method of setting the preset ratio, but the embodiments of the present disclosure is not limited thereto.

For example, integral images may be adopted in the process of calculating the amount of effective signals in the region, which is covered by the rectangle, of the image. The amount of effective signals in the region, which is covered by the rectangle, of the image may be obtained by the calculation of integrograms of end points of the region, which is covered by the rectangle, of the image and the simple addition and subtraction, such that the amount of calculation is further reduced and the computing speed is improved.

Figure 9:
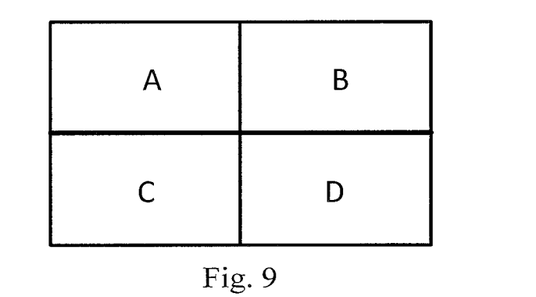
FIG. 9 is an exemplary diagram illustrating a region which is covered by a pre-set pattern of an image provided by an embodiment of the present disclosure.
Figure 10:
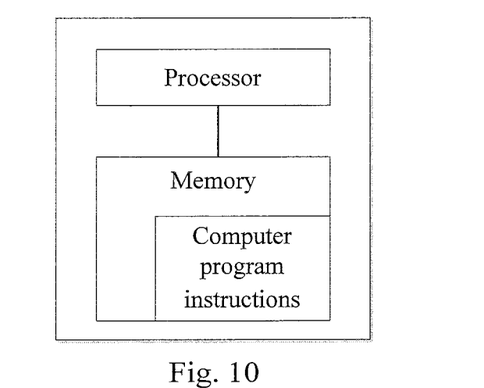
FIG. 10 is an exemplary block diagram of further another detection device provided by an embodiment of the present disclosure.
Figure 11:
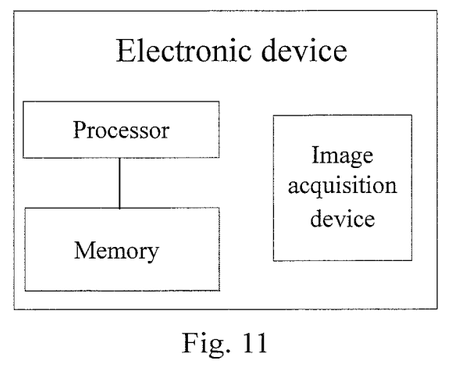
FIG. 11 is an exemplary block diagram of another electronic device provided by an embodiment of the present disclosure.
Figure 12:
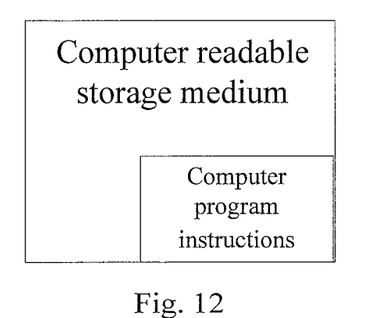
FIG. 12 is an exemplary block diagram of a computer readable storage medium provided by an embodiment of the present disclosure.

For example, the region, which is covered by the rectangle, of the image may be divided into four parts, for example, four sub-rectangle as illustrated in FIG. 9. The upper left part is A, the upper right part being B, the lower left part being C, the lower right part being D; end points at the lower right corners of the A, B, C and D parts respectively correspond to 1, 2, 3 and 4. For example, the sizes (the lengths and the widths) of the four parts may be the same. Integrograms of the end points of the parts are utilized for calculating the following parameters; ii(1) which is the amount of effective signals in the A part; ii(2) is the amount of effective signals in the A and B parts; ii(3) is the amount of effective signals of the A and C parts; and ii(4) is the amount of effective signals of the A, B, C and D parts. Therefore, the amount of effective signals of each of the A, B, C and D parts can be rapidly obtained by the addition and subtraction of the integrograms of the pixel brightness values of the four end points, and then the amount of effective signals in the region which is covered by the rectangle, of the image can be obtained.

For example, the ratio $\alpha_i$ (i.e., the first ratio) of the amount of effective signals in the region, which is covered by the rectangle, of the image to the total amount of effective signals of the image can be obtained through the following equation:

$$a_i = \frac{S(R_i)}{S}.$$

For example, the preset ratio $\alpha_0$ of the amount of effective signals in the region, which is covered by the rectangle, of the image to the total amount of effective signals of the image can be set according to specific implementation demands, and $\alpha_0$ may be between 85% and 95%. For example, $\alpha_0$ may be 90%. If the ratio $\alpha_i$ is greater than or equal to the preset ratio $\alpha_0$, widen of the region, which is covered by the pre-set pattern, of the image can be stopped.

Illustrative description will be given below by taking the case where the pre-set pattern is a set of circles as an example. It should be understood that if the pre-set pattern is a circle C, the radius of the circle C (for example, a circle with the maximum size in the above set of circles) is r, and the region, which is covered by the circle, of the image can be gradually widened according to the pre-set step length (for example, $$r * \frac{1}{N}$$

N may be set according to the size of the image, for example, may be set to be 10. For example, the radius of a circle with the smallest radius in the set of circles is equal to the pre-set step length, and the radius $R_{ci}$ of the $i^{st}$ circle can be obtained through the following equation.

$$R_{ci} = r * \frac{1}{N}.$$

The ratio (that is, the first ratio) of the amount of effective signals in the region, which is covered by the circle, of the image to the total amount of effective signals of the image is calculated. When the first ratio is greater than or equal to the preset ratio, widen of the region, which is covered by the pre-set pattern (the circle), of the image will be stopped, and the region, which is covered by the current pre-set pattern (the current circle) is taken as the effective area of the image. The current pre-set pattern (the current circle) is a minimum pre-set pattern (the circle with minimum size in the set of circles) with the first ratio being larger than or equal to the preset ratio.

S206: determining whether or not the diffuser is in abnormal working state according to information of the effective area.

For example, in some examples, whether or not the diffuser is in abnormal working state may be determined according to the serial number (that is, the serial number of the pre-set pattern corresponding to the effective area) of the pre-set pattern with the minimum size in a first sub-set of the set of the pre-set patterns, in which the first ratio of each of the pre-set patterns in the first sub-set of the set of pre-set patterns is larger than or equal to the preset ratio.

For example, if a set of pre-set pattern are set (for example, preset), the set of pre-set pattern may be sequenced in order from small to large (small size to large size); and if the serial number of the pre-set pattern corresponding to the effective area is less than or equal to a first pre-set serial number (e.g., 7), it is determined that the diffuser is in abnormal working state, for example, the diffuser falls off or other abnormalities can be caused (for example, at least partial area of the diffuser is damaged).

For example, in the case where the pre-set pattern is a set of rectangles, including 10 rectangles from small to large, and the first pre-set serial number is 7, if the serial number of a rectangle corresponding to the determined effective area of the image is 5, because 5 is less than 7, it indicates that the effective signals of the image are located in a small area, and therefore it can be determined that the diffuser is in abnormal working state (for example, falls off); if the serial number of a rectangle corresponding to the determined effective area of the image is 9, because 9 is greater than 7, it indicates that the effective signals of the image are relatively dispersed, and therefore it can be determined that the diffuser is in normal working state (for example, does not fall off). The method does not need to perform big data training in advance, has small amount of calculation and rapid computing speed, and can determine (for example, rapidly determine) whether or not the diffuser is in abnormal working state.

For example, if a set of pre-set patterns are set (for example, preset), the set of pre-set patterns may also be sequenced in order from large to small (large size to small size), and the diffuser is determined in the abnormal working state if the serial number of the pre-set pattern corresponding to the effective area is greater than or equal to a second pre-set serial number. The diffuser in the abnormal working state may be a diffuser which is fall off with respect to the light source or a diffuser with other abnormalities (for example, at least partial area of the diffuser is damaged). For example, the second pre-set serial number may be different from the first pre-set serial number, and the second pre-set serial number may be, for example, 4.

In some other examples, whether or not the diffuser is in abnormal working state may also be determined according to the area of the effective area of the image. For example, as for a specific 3D image acquisition device, after light emitted by a light source of the 3D image acquisition device propagated through the diffuser, the distribution of effective signals of the 3D image acquisition device may be substantially determined. In this case, a preset area may be set in accordance with the experience, and the area of the effective area of the image is calculated. If the area of the effective area of the image is less than or equal to the preset area, it indicates that the effective signals of the image are concentrated in (located in) a small area, and it is determined that the diffuser is in abnormal working state; and if the area of the effective area of the image is greater than the preset area, it indicates that the effective signals of the image are relatively dispersed, and it is determined that the diffuser is in the normal working state (does not fall off).

In some other examples, whether or not the diffuser is in abnormal working state may also be determined according to the ratio of the area of the effective area to the area of the image. If the ratio of the area of the determined effective area of the image to the area of the image is less than or equal to a preset area ratio, it indicates that the effective signals of the image are located in a small area, and therefore it is determined that the diffuser is in abnormal working state; and if the ratio of the area of the determined effective area of the image to the area of the image is greater than the preset area ratio, it indicates that the effective signals of the image are relatively dispersed, and therefore it is determined that the diffuser is in normal working state.

For example, in the case where it is determined that the diffuser is in abnormal working state, the electronic device may output prompt information of diffuser abnormity (for example, fall-off). The prompt information of diffuser abnormity (for example, fall-off) may be displayed to the user via a display and may also be played to the user through a loudspeaker, so as to prompt the user to perform corresponding actions to allow the diffuser to be in the normal working state.

For example, the abnormity degree of the diffuser may also be determined according to the information of the effective area, so as to assist the user in determining the abnormity type of the diffuser. For example, the abnormity degree of the diffuser may be determined according to the ratio of the area of the effective area to the area of the image. For example, if the ratio of the area of the effective area to the area of the image is less than a first threshold (for example, 10%), it can be determined that the diffuser has a first degree abnormity (that is, severe abnormity; for example, completely falling off). For another example, if the ratio of the area of the effective area to the area of the image is greater than a second threshold (for example, 75%) and less than a third threshold (for example, 85%), it can be determined that the diffuser has a second degree abnormity (that is, slight abnormity; for example, slight offset).

For example, the severe abnormity of the diffuser can be rapidly detected by determining the effective area of the image by application of a set of pre-set patterns with the sizes of pre-set patterns being increased gradually, so as to prompt the user in time when the diffuser has severe abnormity.

It should be noted that the embodiments of the present disclosure is not limited to the use of a set of pre-set patterns with gradually increased size to determine the effective area of the image, and may also adopt a set of pre-set patterns with gradually reduced size to determine the effective area of the image, or adopt a set of pre-set patterns of which the size does not meet the monotonous change rule to determine the effective area of the image, as long as the pre-set pattern with the minimum size in the first sub-set of the set of the pre-set patterns can be determined based on the above set of pre-set patterns, in which the first ratio of each of the pre-set patterns in the first sub-set of the set of the pre-set patterns is larger than or equal to the preset ratio. For example, illustrative description will be given below to the use of the set of pre-set patterns with gradually reduced size to determine the effective area of the image.

Firstly, the ratio (that is, the first ratio) of the amount of effective signals to the total amount of effective signals of the image may be obtained based on the pre-set pattern (e.g., rectangle) with the maximum size in the set of pre-set pattern; and then a first ratio is obtained through calculating a ratio of an amount of effective signals in the region, which is covered by the pre-set pattern with the maximum size in the set of pre-set pattern, of the image to the total amount of effective signals. Secondly, in the case where the first ratio is less than or equal to the preset ratio, outputting prompt information that an abnormity is present (for example, the light source is not in the working state, or a failure of the light source is present) or the size of the pre-set pattern is small, such that the user can remove the abnormity or set a pre-set pattern with a size being larger than the maximum size in the set of pre-set pattern, before conducting further steps of determining the effective area of the image; in the case where the first ratio is larger than the preset ratio, gradually reducing the size of the region, which is covered by the pre-set pattern, of the image, until the first ratio is less than or equal to the preset ratio.

In an example, the size of the region, which is covered by the pre-set pattern, of the image is gradually reduced, until the first ratio is less than or equal to the preset ratio includes: using a new pre-set pattern, to cover the image and determining that whether or not the first ratio obtained based on the new pre-set pattern is less than or equal to the preset ratio, in which the new pre-set pattern has a size which is smaller than the size of the pre-set pattern with the maximum size in the set of pre-set patterns and is immediately adjacent to the pre-set pattern with the maximum size after the set of pre-set patterns are sequenced according to size. If it is determined that the first ratio obtained based on the new pre-set pattern is less than or equal to the preset ratio, setting the region, which is covered by the pre-set pattern, of the image as the effective area of the image. If it is determined that the first ratio obtained based on the new pre-set pattern is greater than the preset ratio, using another new pre-set pattern to cover the image and determining that whether or not the first ratio obtained based on the another new pre-set pattern is less than or equal to the preset ratio, in which another new pre-set pattern has a size which is smaller than the size of the new pre-set pattern and is immediately adjacent to the new pre-set pattern after the set of pre-set patterns are sequenced according to size. If it is determined that the first ratio obtained based on another new pre-set pattern is less than or equal to the preset ratio, setting the region, which is covered by the new pre-set pattern, of the image as the effective area of the image. If it is determined that the first ratio obtained based on another new pre-set pattern is greater than the preset ratio, using further another new pre-set pattern(s) to determine that whether or not the first ratio obtained based on further another new pre-set pattern(s) is (are) less than or equal to the preset ratio, no further descriptions will be given here.

It should be noted that the embodiments of the present disclosure may also detect whether or not the diffuser is abnormal on the basis of a single pre-set pattern (e.g., a rectangle). For example, detecting of whether or not the diffuser is abnormal on the basis of a single pre-set pattern includes: acquiring an image of the scene; determining an effective area of the image; and determining whether or not the diffuser is in an abnormal working state according to information of the effective area. For example, determining of the effective area of the image includes: covering a pre-set pattern on the image; and setting a region, which is covered by the pre-set pattern, of the image as the effective area. For example, determining of whether or not the diffuser is in the normal working state according to the information of the effective area includes: obtaining a total amount of effective signals of the image; obtaining a first ratio through calculating a ratio of an amount of effective signals in a region, which is covered by the pre-set pattern, of the image to the total amount of effective signals; and determining whether or not the diffuser is in the abnormal working state through comparing the first ratio with a preset ratio. In the case where the center of the image coincides with the center of the pre-set pattern, it is determined that the diffuser is in the abnormal working state if the ratio of the amount of effective signals to the total amount of effective signals is greater than or equal to the preset ratio.

Figure 5:
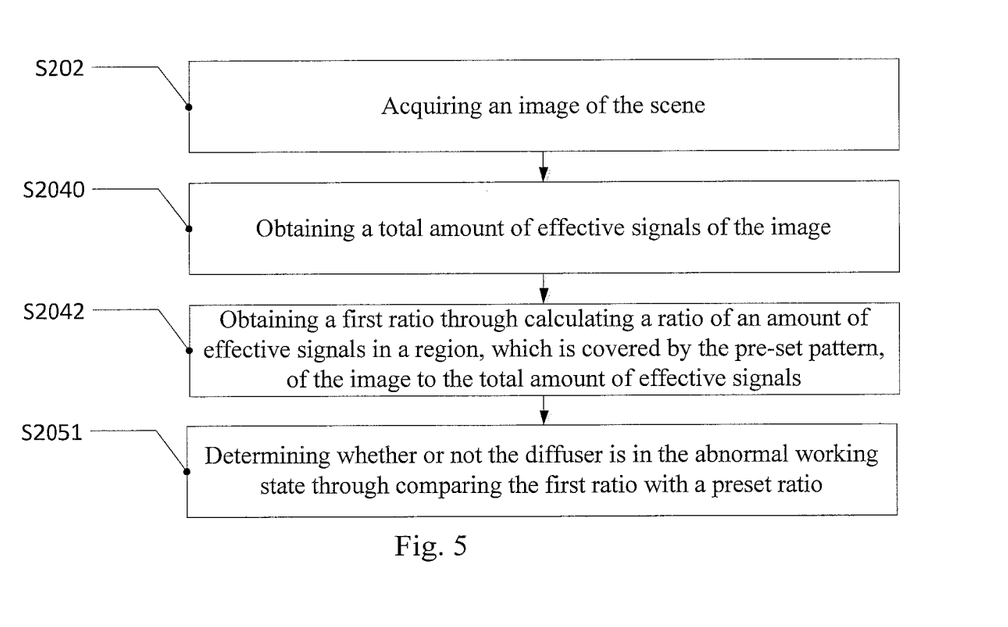
FIG. 5 is an exemplary flowchart of another detection method provided by an embodiment of the present disclosure.

Illustrative description will be given below to the method of detecting whether or not the diffuser is abnormal on the basis of a single pre-set pattern (e.g., a rectangle) with the following example. As illustrated in FIG. 5, the detection method in the following example includes the following steps S202, S2040, S2042 and S2051.

S202: acquiring an image of the scene.

For example, light emitted by the light source is irradiated on at least partial area of the scene.

S2040: obtaining a total amount of effective signals of the image.

For example, the total amount of effective signals of the image can be obtained through calculating the total amount of effective signals of the image according to brightness values of pixels of the image.

S2042: obtaining a first ratio through calculating a ratio of an amount of effective signals in a region, which is covered by the pre-set pattern, of the image to the total amount of effective signals.

For example, the center of the image may coincide with the center of the pre-set pattern. For example, the size of the pre-set pattern may be set according to actual experience. For example, the width and the length of the pre-set pattern may be respectively 15-20% of the width and the length of the image (the scene to be photographed). For example, the amount of effective signals in the region, which is covered by the pre-set pattern, of the image may be calculated by the method in the above examples. No further description will be given here.

S2051: determining whether or not the diffuser is in the abnormal working state through comparing the first ratio with a preset ratio.

For example, in the step S2051, the preset ratio of the amount of effective signals in the region, which is covered by the pre-set pattern, of the image to the total amount of effective signals of the image is set to be equal to $\alpha_0$, and $\alpha_0$ may be between 85% and 95%. For example, $\alpha_0$ may be equal to 90%.

Figure 7:
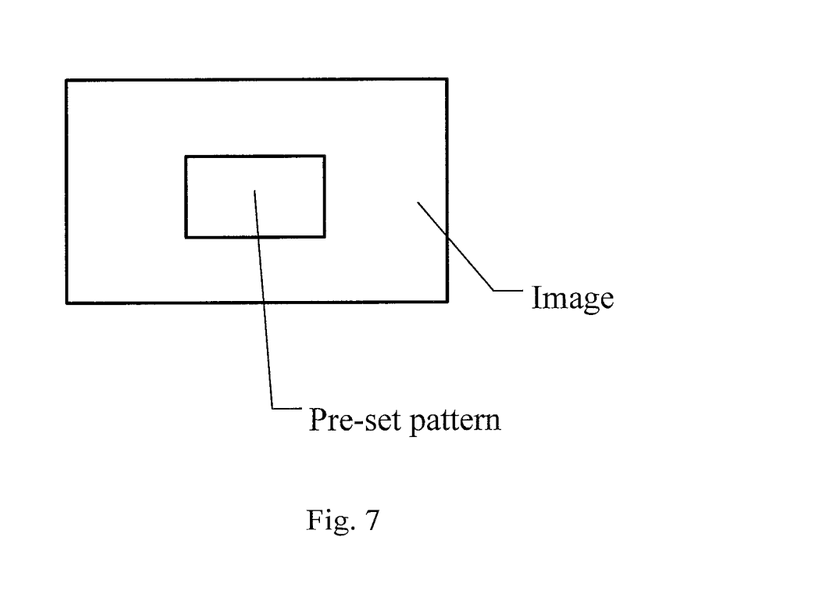
FIG. 7 is an exemplary diagram illustrating an arrangement for a pre-set pattern provided by an embodiment of the present disclosure.

For example, as illustrated in FIG. 7, in the case where the center of the image coincides with the center of the pre-set pattern, if the first ratio is greater than or equal to the preset ratio, the majority of the light emitted by the light source is located in a region corresponding to the pre-set pattern, and it can be determined that the diffuser is in the abnormal working state.

Figure 8:
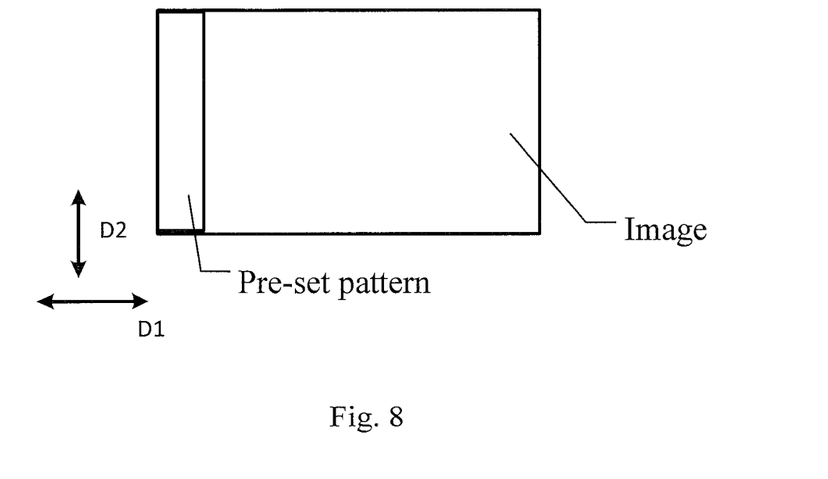
FIG. 8 is an exemplary diagram illustrating another arrangement for a pre-set pattern provided by an embodiment of the present disclosure.

For example, the center of the image may also not coincide with the center of the pre-set pattern. For example, as illustrated in FIG. 8, the pre-set pattern may be provided at a side (for example, left side) of the image, and the width of the pre-set pattern (the width of the pre-set pattern along a first direction D1) may be equal to 15-20% of the length of the image (the length of the image along the first direction D1) or other suitable values, and the length of the pre-set pattern (the length of the pre-set pattern along a second direction D2) may be equal to the width of the image (the width of the image along the second direction D2) or other suitable values. In this case, it can be determined that the diffuser is in the normal working state if the ratio of the amount of effective signals to the total amount of effective signals is greater than or equal to the preset ratio (for example, 15%-18%); and it can be determined that the diffuser is in the abnormal working state if the ratio of the amount of effective signals to the total amount of effective signals is smaller than the preset ratio.

For example, in the presented example, the diffuser abnormity detection speed can be improved because the effective area of the image can be determined based on the single pre-set pattern (e.g., a rectangle).

The detection method provided by the embodiments of the present disclosure can determine the effective area of the image of the scene, in which the light emitted by the light source is irradiated on at least partial area of the scene, and can determine whether or not the diffuser in the abnormal working state (for example, falls off or not) according to the information of the effective area of the image. In addition, in some examples, the detection method has small amount of calculation and rapid computing speed, and can rapidly and effectively determine whether or not the diffuser of the image acquisition device is in abnormal working state.

Figure 4:
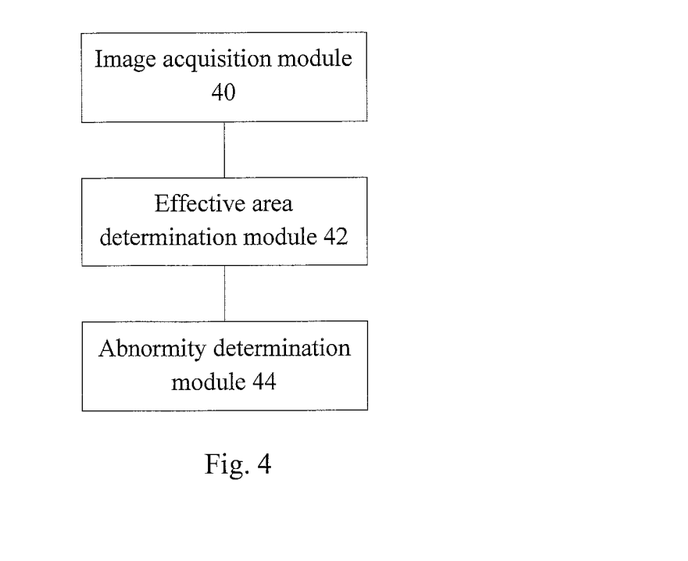
FIG. 4 is an exemplary block diagram of a detection device provided by an embodiment of the present disclosure.

Corresponding to the detection method provided by the embodiments of the present disclosure, the embodiments of the present disclosure further provide a detection device, which can be applied in an image acquisition device or an electronic device equipped with an image acquisition device. The image acquisition device includes a light source and a diffuser, and the diffuser is configured to scatter light emitted by the light source and the light emitted by the light source being irradiated on at least partial area of a scene. FIG. 4 is an exemplary block diagram of a detection device provided by the embodiments of the present disclosure. As illustrated in FIG. 4, the device includes an image acquisition module 40, an effective area determination module 42 or an abnormity determination module 44.

The image acquisition module 40 (e.g., an image sensor) is configured to acquire an image of the scene. The effective area determination module 42 is configured to determine an effective area of the image (for example, determining of the effective area of the image can be conducted by covering the image with a pre-set pattern). The abnormity determination module 44 is configured to determine whether or not the diffuser is in abnormal working state according to information of the effective area. The effective area determination module 42 and the abnormity determination module 44 may be implemented by software, firmware, hardware or any combination thereof. For example, the hardware includes field-programmable gate array (FPGA), etc.

For example, the effective area determination module 42 may also be configured to: obtain brightness values of pixels of the image by performing an image thresholding process to the image. For example, performing of the image thresholding process to the image includes: determining initial brightness values of the pixels in the image; setting brightness values of a first group of the pixels, initial brightness values of which are within a set brightness range, to be initial brightness values of corresponding pixels; and setting brightness values of a second group of the pixels, initial brightness values of which are outside the set brightness range, to be zero.

For example, the effective area determination module 42 may also be configured to determine the effective area of the image by covering the image with the pre-set pattern. For example, determining of the effective area of the image by covering the image with the pre-set pattern includes: obtain a total amount of effective signals of the image through, for example, calculating the total amount of effective signals of the image according to the brightness values of the pixels; obtain a first ratio through calculating the ratio of the amount of effective signals in a region, which is covered by the pre-set pattern, of the image to the total amount of effective signals by, for example, taking the center of the image as the center of the pre-set pattern, in which the total amount of effective signals is the sum of the brightness values of the pixels of the image, and the amount of effective signals in the region, which is covered by the pre-set pattern, of the image is the sum of the brightness values of the pixels in the region, which is covered by the pre-set pattern, of the image; compare the first ratio with the preset ratio to obtain a comparison result, and obtain the effective area of the image based on the comparison result.

For example, obtaining of the effective area of the image based on the comparison result includes: in the case where the first ratio is greater than or equal to the preset ratio, setting the region, which is covered by the pre-set pattern, of the image as the effective area of the image; and in the case where the first ratio is smaller than the preset ratio, using a new pre-set pattern, the size of which is larger than the size of the pre-set pattern, to conduct determining of the effective area of the image by covering the image with the new pre-set pattern. For example, details regarding obtaining of the effective area of the image based on the comparison result can refer to detection method, and no further descriptions will be given here.

For example, the effective area determination module 42 may also be configured to: gradually widen the region, which is covered by the pre-set pattern, of the image, until the ratio of the amount of effective signals in the region, which is covered by the pre-set pattern, of the image to the total amount of effective signals is greater than or equal to the preset ratio; and take the region, which is covered by the current pre-set pattern, of the image as the effective area of the image, in which the current pre-set pattern is the pre-set pattern with minimum size and allows the ratio of the amount of effective signals in the region, which is covered by the current pre-set pattern, of the image to the total amount of effective signals is greater than or equal to the preset ratio.

For example, the effective area determination module 42 may also be configured to: obtain the total amount of effective signals of the image by calculating the sum of the brightness values of the pixels of the image; calculate the amount of effective signals in the region, which is covered by the pre-set pattern, of the image by adoption of integral images; and determine the ratio of the amount of effective signals in the region, which is covered by the pre-set pattern, of the image to the total amount of effective signals.

For example, the effective area determination module 42 may also be configured to: gradually widen the region, which is covered by the pre-set pattern, of the image by application of a set of pre-set patterns in order from small to large; or gradually widen the region, which is covered by the pre-set pattern, of the image according to the pre-set step length.

For example, the abnormity determination module 44 may also be configured to: sequence the preset one set of pre-set patterns in order from small to large, and determine that the diffuser is in abnormal working state if the serial number of the pre-set pattern corresponding to the effective area is less than or equal to a pre-set serial number (a first pre-set serial number).

For example, the abnormity determination module 44 may also be configured to: determine that the diffuser is in abnormal working state if the area of the effective area is less than or equal to the preset area; or determine that the diffuser is in abnormal working state if the ratio of the area of the effective area to the area of the image is less than or equal to the preset area ratio.

For example, the device may further include an information prompt module. The information prompt module is connected with the abnormity determination module 44 and configured to output abnormity prompt information (for example, diffuser falls off) if the abnormity determination module 44 determines that the diffuser is in abnormal working state (for example, falls off). The information prompt module may be implemented by software, firmware, hardware or any combination thereof. For example, the hardware includes FPGA, etc. For example, the information prompt module may include a display or a loudspeaker.

The embodiments of the present disclosure provide another detection device, which includes a processor and a memory. The memory is configured to store computer program instructions that are suitable to be executed by the processor. Upon the processor running the computer program instructions, the detection device performs a following method including: acquiring an image of a scene, in which light emitted by a light source is irradiated on at least partial area of the scene; determining an effective area of the image; and determining whether or not a diffuser is in an abnormal working state according to information of the effective area, in which the diffuser is configured to scatter light emitted by the light source. The detection device provided in the presented example can be a detection device which is separated from an image acquisition device or a detection device which is integrated in an image acquisition device. The detection device provided in the presented example can be configured to determining whether or not the diffuser in the image acquisition device is in the abnormal working state. The detection device provided in the presented example may be implemented by a server, or a network device.

The implementation principle and the technical effects of the detection device provided by the embodiments of the present disclosure are similar or the same with those of the foregoing embodiments. For simple description, those not mentioned in the detection device embodiments may refer to corresponding content in the foregoing detection method embodiment.

The detection device provided by the embodiments of the present disclosure determines the effective area of the image of the scene, in which the light emitted by the light source is irradiated on at least partial area of the scene, and can determine whether or not the diffuser is in abnormal working state (for example, falls off or not) according to the information of the effective area of the image. In addition, in some examples, the detection method has small amount of calculation and rapid computing speed, and can rapidly and effectively determine whether or not the diffuser of the image acquisition device is in abnormal working state.

In addition, the embodiments of the present disclosure provide an electronic device, which includes an image acquisition device, a memory and a processor, wherein the image acquisition device includes a light source and a diffuser, and the diffuser is configured to scatter light emitted by the light source and the light emitted by the light source is irradiated on at least partial area of a scene. Computer program instructions capable of running on the processor are stored in the memory. The steps of the method provided by the foregoing method embodiment are implemented when the processor executes the computer program instructions.

Moreover, the embodiments of the present disclosure further provide a computer readable storage medium. Computer program instructions are stored on the computer readable storage medium. The steps of the method provided by the foregoing method embodiment are implemented when the computer program instructions are run by a processor.

The computer program products of the detection method and the detection device, provided by the embodiments of the present disclosure, include the computer readable storage medium storing program codes. Instructions in the program codes are used for executing the detection method provided by the foregoing method embodiment, and the specific implementation may refer to the method embodiment. No further description will be given here.

The detection method may be implemented by a computer readable storage medium and the computer readable storage medium may be sold or used as a standalone software product. Based on such understanding, the technical solution of the present disclosure or a part of the technical solution may be embodied in the form of a software product. The computer software product is stored in a storage medium and includes a plurality of instructions for allowing a computer device (may be a PC, a server, or a network device) to execute all or part of the steps of the detection method provided by the embodiments of the present disclosure. The foregoing storage medium includes: a USB memory, a mobile hard disk, a read-only memory (ROM), a random access memory (RAM), a magnetic disk, an optical disk, or other medium that can store program codes.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A detection method for an image acquisition device, the image acquisition device comprising a light source and a diffuser, the diffuser being configured to scatter light emitted by the light source and the light emitted by the light source being irradiated on at least partial area of a scene, comprising:
    acquiring an image of the scene;
    determining an effective area of the image;
    determining whether or not the diffuser is in an abnormal working state according to information of the effective area, comprising:
    determining that the diffuser is in the abnormal working state if an area of the effective area is less than or equal to a preset area.

2. The detection method according to claim 1,
    wherein determining of the effective area of the image is conducted by covering the image with a pre-set pattern; and
    wherein determining of the effective area of the image by covering the image with the pre-set pattern comprises:
        obtaining a total amount of effective signals of the image;
        obtaining a first ratio through calculating a ratio of an amount of effective signals in a region, which is covered by the pre-set pattern, of the image to the total amount of effective signals; and
        comparing the first ratio with a preset ratio to obtain a comparison result, and obtaining the effective area of the image based on the comparison result.

3. The detection method according to claim 2, wherein obtaining of the effective area of the image based on the comparison result comprises:
    in a case where the first ratio is greater than or equal to the preset ratio, setting the region, which is covered by the pre-set pattern, of the image as the effective area of the image; and
    in a case where the first ratio is smaller than the preset ratio, using a new pre-set pattern, a size of which is larger than a size of the pre-set pattern, to conduct determining of the effective area of the image by covering the image with the new pre-set pattern.

4. The detection method according to claim 3, wherein a center of the image coincides with a center of the pre-set pattern;

the total amount of effective signals is a sum of brightness values of the pixels of the image; and the amount of effective signals in the region, which is covered by the pre-set pattern, of the image is equal to a sum of the brightness values of pixels in the region, which is covered by the pre-set pattern, of the image.

5. The detection method according to claim 1, further comprising:

performing an image thresholding process to the image, wherein performing of the image thresholding process to the image comprises:

determining initial brightness values of the pixels in the image;

setting brightness values of a first group of the pixels, initial brightness values of which are within a set brightness range, to be initial brightness values of corresponding pixels; and setting brightness values of a second group of the pixels, initial brightness values of which are outside the set brightness range, to be zero.

6. The detection method according to claim 1, further comprising:

determining an abnormity degree of the diffuser according to the information of the effective area, wherein determining of the abnormity degree of the diffuser according to the information of the effective area comprises:

determining that a first degree abnormity of the diffuser is present, in a case where a ratio between an area of the effective area and an area of the image is smaller than a first threshold; and determining that a second degree abnormity of the diffuser is present, in a case where the ratio between the area of the effective area and the area of the image is greater than a second threshold and is smaller than a third threshold; and wherein the second threshold is greater than the first threshold and is smaller than the third threshold.

7. The detection method according to claim 2, wherein calculating of the ratio of the amount of effective signals in the region, which is covered by the pre-set pattern, of the image to the total amount of effective signals comprises:

obtaining the amount of effective signals in the region, which is covered by the pre-set pattern, of the image by adoption of integral images; and determining the ratio of the amount of effective signals in the region, which is covered by the pre-set pattern, of the image to the total amount of effective signals.

8. The detection method according to claim 3, further comprising:

providing a set of pre-set patterns with sizes of the pre-set patterns being increased gradually;

sequencing the set of pre-set patterns according to the sizes of the pre-set patterns, wherein a pre-set pattern which is first to cover the image is a pre-set pattern, a size of which is smallest in the set of pre-set patterns, in the set of pre-set patterns; and the new pre-set pattern is immediately adjacent to the pre-set pattern after the set of pre-set patterns is sequenced.

9. The detection method according to claim 8, wherein determining of whether or not the diffuser is in the abnormal working state according to the information of the effective area comprises:

sequencing the set of pre-set patterns in order from small to large, and determining that the diffuser is in the abnormal working state if a serial number of the pre-set pattern corresponding to the effective area is less than or equal to a first pre-set serial number; or, sequencing the set of pre-set patterns in order from large to small, and determining that the diffuser is in the abnormal working state if a serial number of the pre-set pattern corresponding to the effective area is greater than or equal to a second pre-set serial number.

10. The detection method according to claim 3, further comprising:

providing an initial pre-set pattern and a pre-set step length, wherein a pre-set pattern which is first to cover the image is the initial pre-set pattern; and a difference between the size of the new pre-set pattern and the size of the pre-set pattern is equal to the pre-set step length.

11. The detection method according to claim 1, wherein determining of whether or not the diffuser is in the abnormal working state according to the information of the effective area further comprises:

determining that the diffuser is in the abnormal working state if a ratio of an area of the effective area to an area of the image is less than or equal to a preset area ratio.

12. The detection method according to claim 1, wherein determining of the effective area of the image is conducted by covering the image with a pre-set pattern; and wherein determining of the effective area of the image by covering the image with the pre-set pattern comprises:

obtaining a total amount of effective signals of the image;

obtaining a first ratio through calculating a ratio of an amount of effective signals in a region, which is covered by the pre-set pattern, of the image to the total amount of effective signals;

outputting prompt information that an abnormity is present or a size of the pre-set pattern is small in a case where the first ratio is less than or equal to the preset ratio;

determining the effective area of the image based on a new pre-set pattern, a size of which is smaller than a size of the pre-set pattern in a case where the first ratio is larger than the preset ratio, wherein determining of the effective area of the image based on the new pre-set pattern comprises:

obtaining a second ratio through calculating a ratio of an amount of effective signals in a region, which is covered by the new pre-set pattern, of the image to the total amount of effective signals;

setting a region, which is covered by a previous pre-set pattern, of the image as the effective area of the image in a case where the second ratio is less than or equal to the preset ratio, wherein the new pre-set pattern covers the image immediately after the previous pre-set pattern; and using another new pre-set pattern, a size of which is smaller than the size of the new pre-set pattern, to conduct determining of the effective area of the image based on the another new pre-set pattern in a case where the second ratio is larger than the preset ratio.

13. The detection method according to claim 1, wherein determining of the effective area of the image comprises:

covering a pre-set pattern on the image; and setting a region, which is covered by the pre-set pattern, of the image as the effective area; and wherein determining of whether or not the diffuser is in the normal working state according to the information of the effective area comprises:
  obtaining a total amount of effective signals of the image;
  obtaining a first ratio through calculating a ratio of an amount of effective signals in a region, which is covered by the pre-set pattern, of the image to the total amount of effective signals; and
  determining whether or not the diffuser is in the abnormal working state through comparing the first ratio with a preset ratio.

14. A detection device, comprising:
a processor and a memory,
wherein the memory is configured to store computer program instructions that are suitable to be executed by the processor; and
upon the processor running the computer program instructions, the detection device performs a following method comprising:
  acquiring an image of a scene, wherein light emitted by a light source is irradiated on at least partial area of the scene;
  determining an effective area of the image; and
  determining whether or not a diffuser is in an abnormal working state according to information of the effective area, wherein the diffuser is configured to scatter light emitted by the light source, comprising:
    determining that the diffuser is in the abnormal working state if an area of the effective area is less than or equal to a preset area.

15. The detection device according to claim 14,
wherein determining of the effective area of the image is conducted by covering the image with a pre-set pattern; and
wherein determining of the effective area of the image by covering the image with the pre-set pattern comprises:
  obtaining a total amount of effective signals of the image;
  obtaining a first ratio through calculating a ratio of an amount of effective signals in a region, which is covered by the pre-set pattern, of the image to the total amount of effective signals; and
  comparing the first ratio with a preset ratio to obtain a comparison result, and obtaining the effective area of the image based on the comparison result;
wherein determining of whether or not the diffuser is in the abnormal working state according to the information of the effective area further comprises:
  determining that the diffuser is in the abnormal working state if a ratio of an area of the effective area to an area of the image is less than or equal to a preset area ratio.

16. An electronic device, comprising an image acquisition device, a memory and a processor,
  wherein the image acquisition device comprises a light source and a diffuser;
  the diffuser is configured to scatter light emitted by the light source and the light emitted by the light source is irradiated on at least partial area of a scene;
  the memory is configured to store computer program instructions that are suitable to be executed by the processor; and
  the detection method according to claim 1 is performed upon the processor running the computer program instructions.

17. A non-transitory computer readable storage medium, wherein computer program instructions are stored on the computer readable storage medium; and
  the detection method according to claim 1 is performed upon a processor running the computer program instructions.

18. The detection method according to claim 1, further comprising:
  outputting diffuser abnormality prompt information if the diffuser is determined to be in the abnormal working state.

* * * * *